July 17, 1934.  G. B. LINDERMAN, JR  1,966,985
DIAPHRAGM METER
Filed March 24, 1931   2 Sheets-Sheet 1

Inventor
GARRETT B. LINDERMAN JR.
By Strauch & Hoffman
Attorneys

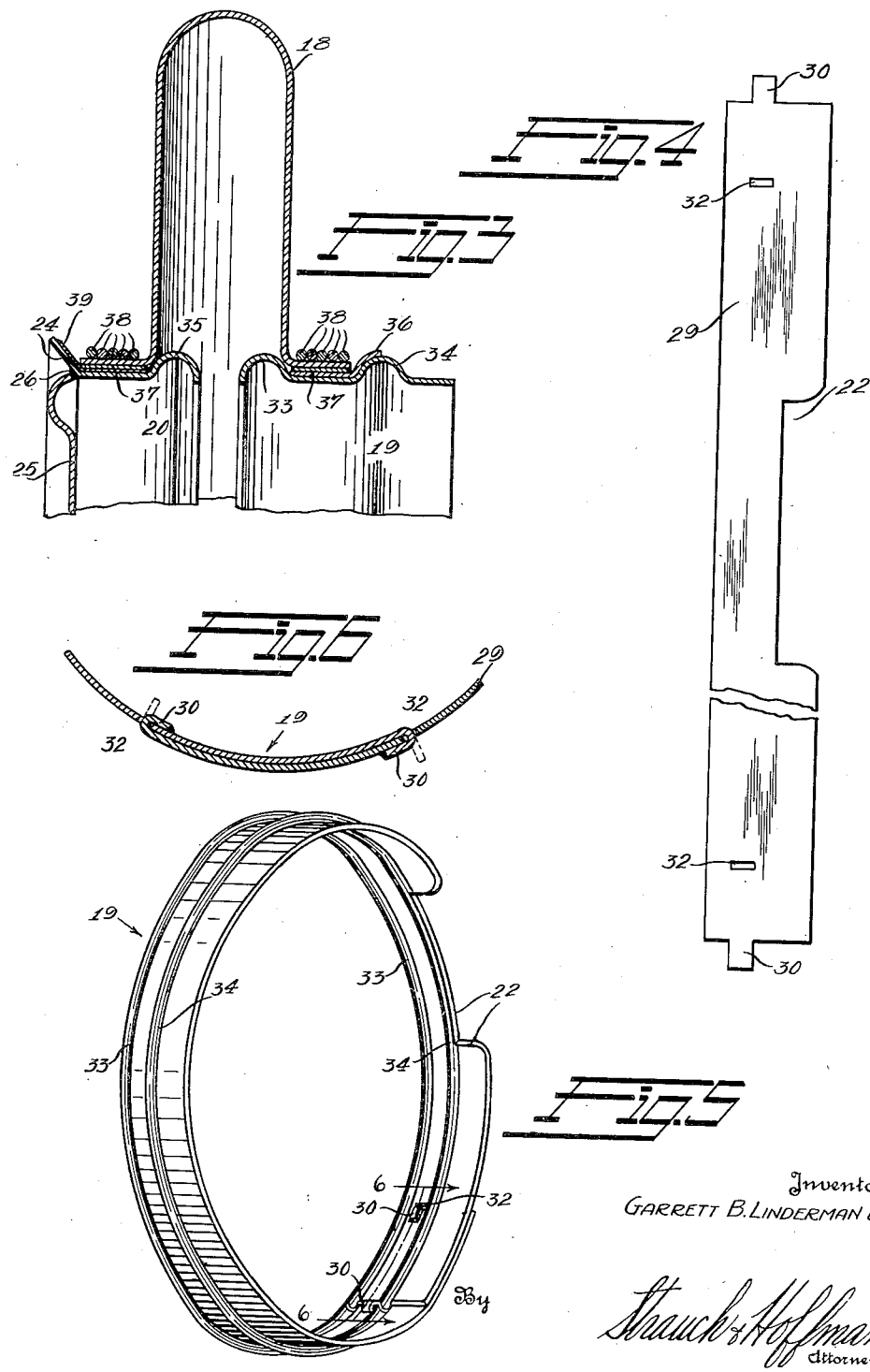

UNITED STATES PATENT OFFICE 1,966,985

DIAPHRAGM METER

Garrett B. Linderman, Jr., Pittsburgh, Pa., assignor to Pittsburgh Equitable Meter Company, Pittsburgh, Pa., a corporation of Pennsylvania Application March 24, 1931, Serial No. 524,986

1 Claim. (Cl. 73—1)

This invention relates to improvements in gas meters, particularly those of the diaphragm type wherein soldering operations are performed on metallic parts of tin or the like at points closely adjacent some non-metallic destructible parts.

In gas meters of this type, the meter casing usually forms a pair of chambers within which a corresponding pair of diaphragm assemblies is disposed for operation by gas flow. Each assembly comprises a bellows, one end of which is sealed by securing it upon a stationary ring that is soldered to a fixed wall, and the other end of which is sealed by securing it upon the ring of a movable plate that serves to actuate the valving and registering mechanism of the meter.

It is desirable to solder the stationary ring to the fixed wall. A gas conduit enters the diaphragm chamber along said fixed wall, this entrance being permitted by slotting or notching the said stationary ring. The soldering line, therefore, extends along one peripheral edge of the ring until it reaches the notch, and then it follows the edge of notch in order to secure and seal the latter upon the gas conduit. Since the edge of the notch necessarily is rather close to the adjacent end of the bellows, it follows that it is difficult to perform the soldering operation without accidentally touching the bellows or some other destructible part to burn or scorch it with the hot iron. These injuries may also be caused by the occasional flow of hot solder against the leather or simply by the rapid conduction of heat through the metal between the seam and the bellows. The defects caused by such burning often are hard to detect and, even though the workman is aware of the accidental scorching he may underestimate the damage done or purposely fail to take proper steps to remedy the defect. Consequently, such defects may not be discovered until the meter has been installed and in operation for some time.

The movable plate, previously referred to, preferably is secured to its ring at the free end of the bellows by soldering along the peripheral edge of the plate. This peripheral edge is in close proximity to the bellows and the skiver or other destructible sealing material that may be employed, and hence there is the danger of injuring the leather as the result of rapid heat conduction or possible flow of hot solder during the assembling operation.

Accordingly, it is the primary object of the present invention to provide an improved meter construction whereby the occurrence of the aforementioned difficulties and accidents and their resulting injuries and defects will be eliminated.

More specifically, it is a major object of this invention to provide a layer of heat resistant and non-conducting material adjacent the notch of the stationary ring, or adjacent the soldered peripheral edge of the movable plate, or at both of these places, to prevent injury to the bellows and other heat-destructible parts. This protective material preferably is so formed and disposed as to prevent injuries from contact with the hot iron, from flowing hot solder and from conduction of heat through the metal adjacent the soldering line. In the case of the stationary ring, the protective layer may extend completely around the ring or it may be shaped for disposition adjacent only the gas conduit. Another object of this invention resides in a novel ring and the method of making the same.

These and further objects of my invention will appear in the following detailed description and the appended claim when studied in conjunction with the accompanying drawings, wherein:

Figure 3 is an enlarged partial sectional view, taken vertically through the upper end of the device shown in Figure 2.

Figures 1, 2:
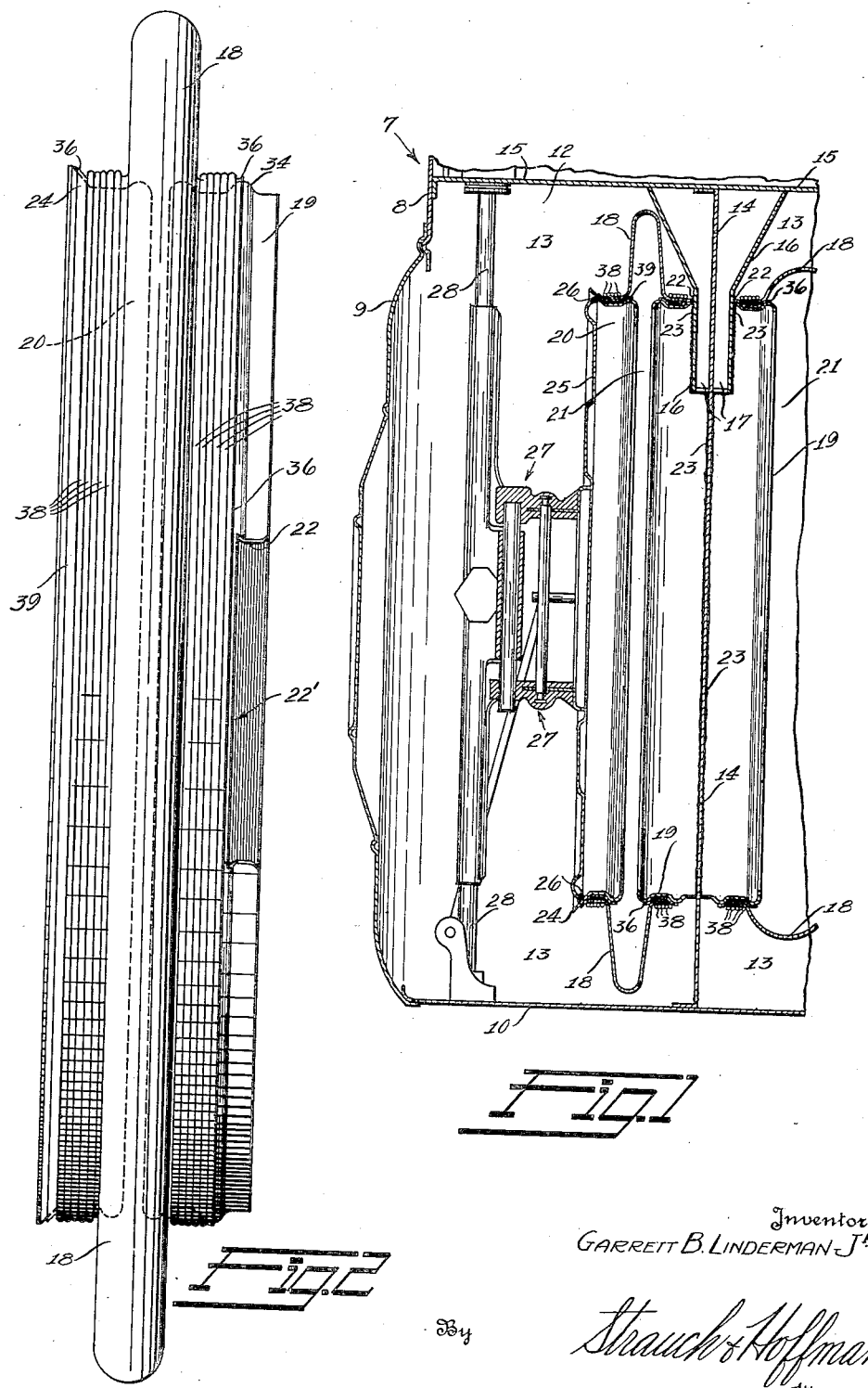
Figure 1 represents a vertical sectional view of a portion of my improved gas meter, the section being taken through the diaphragm assemblies and the gas conduits which enter the latter.
Figure 2 is an enlarged plan view of one of the diaphragm assemblies of Figure 1, prior to its insertion within the meter casing.

Figure 4 constitutes a developed view of the stationary ring of the diaphragm assembly, showing one stage of the formation of said ring.

Figure 5 is a perspective view of the stationary ring, completed and ready to receive one edge of the bellows.

Figure 6 represents an enlarged detail sectional view taken on the line 6—6 of Figure 5.

With continued reference to the drawings, wherein like numerals are employed to designate like parts, and with particular reference for the moment to Figure 1, the numeral 7 indicates a gas meter of which only a sufficient portion is shown to disclose the improvements of this invention. This meter portion comprises a casing, preferably made of sheet tin, which is formed by side walls 8, cover plates 9 fitting upon the walls 8, a bottom 10 and end walls 12. The casing is divided into two diaphragm-housing chambers 13 by a vertical partition wall 14. Only the left wall 8 and its cover 9 are seen in Figure 1, but it will be understood that the corresponding right-hand elements are similarly constructed. The casing has a top 15, which actually is a horizontal partition in the meter for separating the chambers 13 from the valving and registering mechanism (not shown) above the chambers.

A pair of gas conduits 16, one for each diaphragm assembly leads downwardly from the undisclosed upper end of the meter where they are controlled by the valve mechanism, and each is open at its lower end as at 17 in order to alternately admit and discharge gas to and from the diaphragm chambers 21.

Each diaphragm assembly comprises a leather bellows 18 secured at one end to a stationary ring 19 and at its other end to a movable ring 20 to form a diaphragm chamber 21. The stationary ring has a notch 22 cut in one of its edges to snugly receive the lower end of one of the conduits 16 and thus permit the remainder of the notched edge to be engaged with the vertical partition 14. The ring is held in this position by soldering along said engaged edge, as indicated at 23. This soldering line, when the notch is reached, passes along the edges of the notch, and thus the ring is completely sealed with respect to the conduit 16 and the partition 14. The movable ring 20 has a flaring flange 24 within which there is sealingly mounted a movable plate 25, by soldering the peripheral edge of the latter within the flange, as indicated at 26. It will be seen that a diaphragm assembly thus constructed forms an expansible chamber and that, when gas is admitted to this chamber through a conduit 16 the plate 25 moves away from the ring 19, and when the gas is discharged the plate moves toward said ring.

Movement of the plate is utilized to actuate a rocker shaft and carrier assembly, designated generally at 27, which actuates the flag post 28 in well known manner. The posts in turn operate the valving and registering mechanism (not shown). The structure thus far broadly described forms no part of the present invention, except by way of association and combination, and a more detailed disclosure of such structure will be found in pending application Serial No. 288,230, filed June 25th, 1928. The subject matter of my invention is included in the following paragraphs.

With reference to Figures 4, 5 and 6, each ring 19 preferably is formed from a flat tin band 29. The band is cut to provide the notch 22, previously described, and to provide a pair of end tongues 30 that are longitudinally aligned with a pair of transverse slots 32. By bending the tongues as shown in broken lines in Figure 6, and then bringing the band ends together until they overlap a suitable distance, the bent tongues may be inserted through the slots 32 and then flattened against the surfaces of the band to form a conveniently made joint in the latter. The seams of the joint may then be soldered to prevent leakage of gas through the ring. The free edge of the ring is beaded, as at 33, and another peripheral bead 34 is formed between the bead 33 and the notched edge of the ring. The beading may be done either when the band is flat or after it is rolled into ring formation. Each movable ring, 20, may be made up in a similar manner from a flat blank. It, however, is not notched and although it has a bead 35 corresponding to bead 33 of ring 19, it has only the flaring flange 24 to take the place of the second bead 34 of ring 19.

The cylindrical surfaces, formed between the beads of ring 19 and between the bead and flange of ring 20, are designed to receive the respective edges of the leather bellows 18. With particular reference to Figures 2 and 3, a band or narrow strip 36 of sheet material, that is resistant and non-conducting to heat, is placed upon said cylindrical surface of the ring 19 and preferably is of sufficient width to cover a portion of the bead 34. In the illustration, this strip 36 is of a material embodying asbestos but it may take many other suitable forms such, for example, as a coating of lacquer that is resistant and insulating to heat. A skiver 37, of goatskin, may then be placed upon the band 36, after which the edge of the bellows 18 is securely bound in place upon the skiver in the usual manner by means of tightly wrapped cording 38.

It will be observed that one edge of the assembled bellows, skiver and cording is in close proximity to the vertical circular edge 22' of the notch 22 and, since the latter is to be soldered against the gas conduit 16, there would be danger of burning or scorching the leather, and possibly the cord, if the insulating strip 36 were not employed. The said strip 36 not only prevents contact between these destructible parts and the hot solder or iron during the soldering operation, but also prevents injurious heat transmission from the soldering line by way of the metal of the ring 19. The strip 36 need not be substantially greater in length than the notch 22, but preferably forms a complete circular band, as shown, in order to provide for more effective sealing and a better balanced arrangement.

The convex bead 34 on the ring cooperates with the heat insulating and resisting material to prevent burning of the bellows and the other destructible material. The height of this bead is at least as great as that of the marginal portion of the bellows, and preferably greater, and hence it will be observed that the soldering iron cannot be pointed into engagement with the soldering line and at the same time brought into contact with the destructible bellows material. The bead further prevents solder while in a molten condition from running into contact with the bellows or cords, and due to its curvature, further increases the surface area of the ring between the soldering line and bellows, thus assisting in preventing heat concentration adjacent the destructible material.

The movable ring, 20, of each diaphragm assembly has the proper bellows edge secured in sealing relationship thereon in substantially the same fashion as just described for the stationary rings. In the illustration (Figure 3) the insulating strip or layer takes the form of a band 39 comprising a coating of heat resistant lacquer or the like. However, asbestos or similar material may be used as on the rings 19. Likewise, the material on rings 19 may be simple coatings as on the rings 20. Ordinarily, the need for insulation on the rings 20 is not so great as for that on the rings 19 adjacent the notches in the latter. However, the strips 39 preferably are incorporated in the assembly, since the leather on the rings 20 occasionally may become burned or scorched, with resultant deterioration and reduction in life, by the transfer of heat thereto from the soldering lines 26 by way of the metal of the rings.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What I claim and desire to secure by U. S. Letters Patent is:—

In subcombination in a gas meter of the diaphragm type, a stationary wall, a gas conduit disposed next to said wall, a ring having one of its edges shaped to engage said wall, and the exterior side of said conduit, said edge being soldered to hold said ring in its engaged position, a nonmetallic bellows having a margin secured upon said ring, said ring having a convex bead between said bellows and said edge that is at least as high as said margin of said bellows and serves to prevent contact between the soldering iron and said bellows during the soldering operation, and a heat-resistant and heat-insulating band interposed between said bellows and the periphery of said ring, said band projecting beyond said margin of said bellows into overlapping relationship with said bead.

GARRETT B. LINDERMAN, Jr.